United States Patent
Tsunogae et al.

(10) Patent No.: US 6,486,264 B1
(45) Date of Patent: Nov. 26, 2002

(54) PROCESS FOR PRODUCING HYDROGENATED RING-OPENING POLYMERIZATION POLYMER OF CYCLOOLEFIN

(75) Inventors: Yasuo Tsunogae, Kawasaki (JP); Masato Sakamoto, Kawasaki (JP); Masaharu Tokoro, Yokosuka (JP); Kazunori Taguchi, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/980,200

(22) PCT Filed: May 31, 2000

(86) PCT No.: PCT/JP00/03520
§ 371 (c)(1),
(2), (4) Date: Nov. 30, 2001

(87) PCT Pub. No.: WO00/73366
PCT Pub. Date: Dec. 7, 2000

(30) Foreign Application Priority Data

May 31, 1999 (JP) .............................. 11-152675
Jun. 29, 1999 (JP) .......................... 11-184379

(51) Int. Cl.$^7$ ................................. C08F 8/04
(52) U.S. Cl. .............. 525/339; 525/332.1; 525/338; 526/145; 526/146; 526/147; 526/281; 526/283
(58) Field of Search ............... 525/332.1, 338, 525/339; 526/145, 146, 147, 281, 283

(56) References Cited

U.S. PATENT DOCUMENTS

| 5,198,511 | A | * | 3/1993 | Brown-Wensley et al. . 526/113 |
| 5,599,882 | A | * | 2/1997 | Nishi et al. ............... 525/332.1 |
| 5,932,664 | A |   | 8/1999 | Chen et al. |
| 5,939,504 | A | * | 8/1999 | Woodson et al. ........... 502/152 |
| 5,990,246 | A |   | 11/1999 | Chen et al. |
| 6,143,851 | A | * | 11/2000 | Nubel et al. .............. 525/329.5 |
| 6,310,121 | B1 | * | 10/2001 | Woodson et al. ........... 502/152 |

FOREIGN PATENT DOCUMENTS

| JP | 05-271326 | 10/1993 |
| JP | 09-077853 | 3/1997 |
| JP | A10-195182 | 7/1998 |
| WO | WO 96/04289 | 2/1996 |
| WO | A1 96/04289 | 2/1996 |

* cited by examiner

*Primary Examiner*—Bernard Lipman
(74) *Attorney, Agent, or Firm*—Birch, Stewart, Kolasch & Birch, LLP

(57) ABSTRACT

A process for producing a hydrogenated product of a polymer prepared through ring-opening polymerization which comprises a polymerization step of polymerizing a cyclic olefin through ring-opening polymerization in the presence of a polymerization catalyst comprising an organoruthenium compound or an organoosmium compound to prepare a polymer, and a hydrogenation step of adding a hydrogenation catalyst and hydrogen into a polymerization system resulting from the polymerization step to hydrogenate the carbon-carbon double bonds of the polymer prepared through the ring-opening polymerization. When the organoruthenium compound- or organoosmium compound-containing catalyst further comprises a carbene compound, the catalyst exhibits a higher activity for the ring-opening polymerization.

9 Claims, No Drawings

PROCESS FOR PRODUCING HYDROGENATED RING-OPENING POLYMERIZATION POLYMER OF CYCLOOLEFIN

This application is the national phase under 35 U.S.C. §371 of PCT International Application No. PCT/JP00/03520 which has an International filing date of May 31, 2000, which designated the United States of America.

TECHNICAL FIELD

This invention relates to a process for producing a hydrogenated product of a cyclic olefin polymer prepared through ring-opening polymerization, with enhanced efficiency.

BACKGROUND ART

A process for polymerizing a cyclic olefin by using a polymerization catalyst comprising a tungsten compound, a molybdenum compound, a ruthenium compound or an osmium compound has hitherto been well known. The polymer produced through ring-opening polymerization according to this process has poor heat-stability because of the presence of double bonds in the backbone chain. As an improvement of this process, a process for hydrogenating a polymer prepared through ring-opening polymerization has been proposed.

For example, a process has been proposed wherein a cyclic olefin is polymerized through metathesis ring-opening polymerization by using a transition metal compound having tungsten or molybdenum as a central atom, and then, a hydrogenation catalyst is added to hydrogenate carbon-carbon double bonds in the backbone chain of the polymer (Japanese Unexamined Patent Publication (hereinafter abbreviated to "JP-A") No. H5-271326, JP-A H9-77853. and JP-A H10-195183). However, when a hydrogenation catalyst is added into a polymerization system as prepared by using a tungsten or molybdenum-containing polymerization catalyst, to hydrogenate a polymer thus-prepared through ring-opening polymerization, the polymerization catalyst poisons the hydrogenation catalyst. Therefore, the hydrogenation reaction must be carried out after the polymerization catalyst is removed from the polymerization system, or a large amount of the hydrogenation catalyst must be used.

In JP-A H10-195182, a process has been reported wherein a cyclic olefin is polymerized through ring-opening polymerization using a catalyst comprising ruthenium-carbene compound, then a modifier such as ethyl vinyl ether is added to modify the catalyst, and then the as-produced polymer is hydrogenated in the presence of the modified catalyst. This process is advantageous in that the polymerization step and the hydrogenation step can be consecutively carried out. However, the present inventors have found that hydrogenation reaction does not proceed often to the desired extent in this process. Further, the above-mentioned catalyst is a homogeneous catalyst and thus the separation and removal thereof from the polymerization system is troublesome.

DISCLOSURE OF THE INVENTION

An object of the present invention is to provide an industrially advantageous process for producing a hydrogenation product of a cyclic olefin polymer prepared through ring-opening polymerization, wherein the hydrogenation reaction can be carried out subsequent to polymerization without separation and removal of a polymerization catalyst from the polymerization system, and the amount of a hydrogenation catalyst can be small.

To achieve the above-mentioned object, the present inventors have made extensive research, and found that, in the case where a cyclic olefin is polymerized through ring opening polymerization using an organoruthenium compound or an organoosmium compound as a polymerization catalyst, and then the obtained polymer is hydrogenated, if a hydrogenation catalyst and hydrogen are added in the polymerization system as-obtained by polymerization, the hydrogenation takes place efficiently to give a hydrogenation product with a high yield; and further found that, when a heterogeneous catalyst supported on a carrier is used as the hydrogenation catalyst added after completion of polymerization, the polymerization catalyst can be easily removed. Further, when a polymerization catalyst containing an organoruthenium compound or an oranoosmium compound, and a heteroatom-containing carbene compound is used, the catalyst exhibits a higher activity for the ring-opening polymerization. Based on these findings, the present invention has been completed.

Thus, in accordance with the present invention, there is provided a process for producing a hydrogenated product of a polymer prepared through ring-opening polymerization which comprises:

a polymerization step of polymerizing a cyclic olefin through ring-opening polymerization in the presence of a polymerization catalyst comprising an organoruthenium compound or an organoosmium compound to prepare a polymer, and a hydrogenation step of adding a hydrogenation catalyst and hydrogen into a polymerization system resulting from the polymerization step to hydrogenate the carbon-carbon double bonds in the polymer prepared through the ring-opening polymerization.

Further, in accordance with the present invention, there is provided a process for producing a polymer through ring-opening polymerization, characterized in that a cyclic olefin is polymerized through ring-opening polymerization using a polymerization catalyst comprising an organoruthenium compound or an organoosmium compound, and a heteroatom-containing carbene compound in the absence of a solvent or in the presence of a halogen-free solvent.

BEST MODE FOR CARRYING OUT THE INVENTION

The invention will be described on preferred embodiments thereof.

(Cyclic Olefin)

The cyclic olefin used in the present invention is chosen from (1) polycyclic olefins having a norbornene ring such as norbornenes, dicyclopentadienes and tetracyclododecenes, and (2) monocyclic olefins and monocyclic diolefins. These olefins may have a substituent such as an alkyl, alkenyl or alkylidene group, or may have a polar group, and further may have a double bond other than the double bonds of the norbornene ring.

Of these, to produce a polymer having excellent heat stability and solubility through ring-opening polymerization, cyclic olefins having three rings through six rings, which include a norbornene ring, are preferable. Cyclic olefins with three rings such as dicyclopentadienes, and cyclic olefins with four rings such as tetracyclododecenes are especially preferable.

Polycyclic Olefins with Norbornene Ring (i) Dicyclopentadienes

By the term "dicyclopentadiene" used herein is meant cyclic olefins having three rings including a norbornene ring. The dicyclopentadienes may have a substituent such as an alkyl, alkenyl or alkylidene group.

As specific examples of the dicyclopentadienes, there can be mentioned dicyclopentadiene and methyldicyclopentadiene. Further, tricyclo[4.3.1$^{2,5}$.0]-deca-3-ene also is included, which has a structure such that the double bonds in the five-membered ring of dicyclopentadiene are saturated.

(ii) Tetracyclododecenes

Tetracyclododecenes are represented by the following formula [4]:

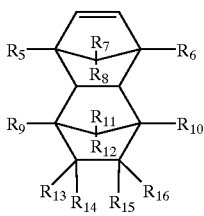

[4]

wherein $R^5$ through $R^{12}$ represent a hydrocarbon group having 1 to 3 carbon atoms or a halogen atom, $R^{13}$ through $R^{16}$ represent a hydrogen atom, a hydrocarbon group having 1 to 20 carbon atoms or a substituent having a halogen, silicon, oxygen or nitrogen atom, and $R^{13}$ and $R^{16}$ may form together a ring.

Tetracyclododecenes include four types of monomers: (a) monomers having no double bond except for the double bond of the norbornene ring, (b) monomers having a double bond in addition to the double bond of the norbornene ring, (c) monomers having an aromatic ring, and (d) monomers having a polar group.

(a) As specific examples of the monomers having no double bond except for the double bond of the norbornene ring, there can be mentioned tetracyclododecene, 8-methyltetracyclododecene, 8-ethyltetracyclododecene, 8-cyclohexyltetracyclododecene and 8-cyclopentyltetracyclododecene. These tetracyclododecene monomers (a) may have a substituent.

(b) As specific examples of the monomers having a double bond in addition to the double bond of the norbornene ring, there can be mentioned 8-methylidenetetracyclododecene, 8-ethylidenetetracyclododecene, 8-vinyltetracyclododecene, 8-propenyltetracyclododecene, 8-cyclohexenyltetracyclododecene and 8-cyclopentenyltetracyclododecene.

(c) As a specific example of the monomers having an aromatic ring, there can be mentioned 8-phenyltetracyclododecene.

(d) As a specific example of the monomers having a polar group, there can be mentioned oxygen atom-containing tetracyclododecenes such as 8-methoxycarbonyltetracyolododecene, 8-methyl-8-methoxycarbonyltetracyclododecene, 8-hydroxymethyltetracyclododecene, tetracyclododecene-8,9-dicarboxylic acid, tetracyclododecene-8,9-dicarboxylic anhydride; nitrogen atom-containing tetracyclododecenes such as 8-cyanotetracyclododecene and tetracyclododecene-8,9-dicarboxylic acid imide; halogen atom-containing tetracyclododecenes such as 8-chlorotetracyclododecene; and silicon atom-containing tetracyclododecenes such as 8-trimethoxysilyl-tetracyclododecene.

(iii) Other Cyclic Olefins Having Norbornene Ring

In the present invention, cyclic olefins having a norbornene ring other than the above-recited cyclic olefins with a norbornene ring can also be used.

Said other cyclic olefins having a norbornene ring include, for example, those which have no ring other than a norbornene ring. As specific examples thereof, there can be mentioned norbornenes such as norbornene, 5-methylnorbornene, 5-ethylnorbornene, 5-butylnorbornene, 5-hexylnorbornene, 5-decylnorbornene, 5-cyclohexylnorbornene and 5-cyclopentylnorbornene; oxanorbornenes such as 5-methyloxanorbornene, 5-ethyloxanorbornene, 5-butyloxanorbornene, 5-hexyloxanorbornene, 5-decyloxanorbornene, 5-cyclohexyloxanorbornene and 5-cyclopentyloxanorbornene; norbornenes having a double bond in addition to the double bond within the ring, such as 5-ethylidenenorbornene, 5-vinylnorbornene, 5-propenylnorbornene, 5-cyclohexenylnorbornene and 5-cyclopentenylnorbornene: and oxanorbornenes having a double bond such as 5-ethylideneoxanorbornene, 5-vinyloxanorbornene, 5-propenyloxanorbornene, 5-cyclohexenyloxanorbornene and 5-cyclopentenyloxanorbornene.

The other cyclic olefins having a norbornene ring further include, for example, those which have a norbornene ring and a six membered ring structure. As specific examples thereof, there can be mentioned hexacycloheptadecenes such as hexacycloheptadecene, 12-methylhexacycloheptadecene, 12-ethylhexacycloheptadecene, 12-butylhexacycloheptadecene, 12-hexylhexacycloheptadecene, 12-decylhexacycloheptadecene, 12-cyclohexylhexacycloheptadecene and 12-cyclopentylhexacycloheptadecene; and hexacycloheptadecenes such as 12-ethylidenehexacycloheptadecene, 12-vinylhexacycloheptadecene, 12-propenylhexacycloheptadecene, 12-cyclohexenylhexacycloheptadecene and 12-cyclopentenylhexacycloheptadecene.

The other cyclic olefins having a norbornene ring further include, for example, those which have a norbornene ring and an aromatic ring. As specific examples thereof, there can be mentioned 5-phenylnorbornene, 5-phenyloxanorbornene, tetracyclo[6.5.1$^{2,5}$.0$^{1,6}$.0$^{8,13}$]trideca-3,8,10,12-tetraene (also called as 1,4-methano-1,4,4a,9a-tetrahydrofluorene) and tetracyclo[6.6.1$^{2,5}$.0$^{1,6}$.0$^{8,13}$]tetradeca-3,8,10,12-tetraene (also called as 1,4-methano-1,4,4a,5,10,10a-hexahydroanthracene).

The other cyclic olefins having a norbornene ring further include, for example, those which have a polar group. As specific examples thereof, there can be mentioned norbornenes having an oxygen atom-containing polar group such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methyl propionate, norbornenyl-2-methyl octanoate, norbornene-5,6-dicarboxylic anhydride, 5-hydroxymethylnorbornene, 5,6-di(hydroxymethyl)norbornene, 5,5-di(hydroxymethyl) norbornene, 5-hydroxy-isopropylnorbornene, 5,6-dicarboxynorbornene and 5-methoxycarbonyl-6-carboxynorbornene; oxanorbornenes having an oxygen atom-containing polar group such as 5-methoxycarbonyloxanorbornene, 5-ethoxycarbonyloxanorbornene, 5-methyl-5- methoxycarbonyloxanorbornene, 5-methyl-5-ethoxycarbonyloxanorbornene, oxanorbornenyl-2-methyl propionate, oxanorbornenyl-2-methyl octanoate, oxanorbornene-5,6-dicarboxylic anhydride, 5-hydroxymethyloxanorbornene, 5,6-di(hydroxymethyl)-oxanorbornene, 5,5-di(hydroxymethyl)oxanorbornene, 5-hydroxy-isopropyloxanorbornene, 5,6-dicarboxyoxanorbornene and 5-methoxycarbonyl-6-carboxyoxanorbornene; norbornenes having a nitrogen atom-containing polar group such as 5-cyanonorbornene and norbornene-5,6-dicarboxylic acid imide; and oxanorbornenes having a nitrogen atom-containing polar group such as 5-cyanooxanorbornene and oxanorbornene-5,6-dicarboxylic acid imide.

In the case where the above-mentioned "other cyclic olefins having a norbornene ring" is used, it is preferable in view of heat stability and solubility that cyclic olefins having a norbornene ring and an aromatic ring are polymerized alone or copolymerized with the above-mentioned cyclopentadiene or tetracyclododecene. For example, a tetrahydrofluorene such as 4-methano-1,4,4a,9a-tetrahydrofluorene can be copolymerized with the above-mentioned cyclopentadiene or tetracyclododecene.

Monocyclic Olefins and Monocyclic Diolefins

Monocyclic olefins and monocyclic diolefins include cyclic olefins and cyclic diolefins, which have 4 to 20 carbon atoms, preferably 4 to 10 carbon atoms, and derivatives of these cyclic olefins and cyclic diolefins.

As specific examples of the monocyclic olefins and the monocyclic diolefins, there can be mentioned monocyclic olefins described in JP-A S64-66216, such as cyclobutene, cyclopentene, methylcyclopentene, cyclohexene, methylcyclohexene, cycloheptene and cyclooctene; and cyclic diolefins described in JP-A H7-258318, such as cyclohexadiene, methylcyclohexadiene, cyclooctadiene, methylcyclooctadiene and phenylcyclooctadiene.

The cyclic olefins may be used either alone or as a combination of at least two thereof. In the case where a dicyclopentadiene or a cyclotetradodecene is copolymerized with other cyclic olefin copolymerizable therewith, the copolymerization ratio is not particularly limited provided that the dicyclopentadiene or the cyclotetradodecene is contained in an amount of 1% to 100% by weight based on the total weight of the monomers. However, in view of heat resistance of the copolymer and commercially availability of a monomer, a dicyclopentadiene or a cyclotetradodecene is used preferably in a larger amount, more specifically, in an amount in the range of 10% to 100% by weight, and more preferably 20% to 100% by weight.

(Polymerization Catalyst)

An organoruthenium compound and an organoosmium compound, contained in a polymerization catalyst used in the present invention, are a ruthenium compound and an osmium compound, respectively, which have an organic compound as a ligand, and include, for example, compounds represented by the following formulae [1], [2] and [3].

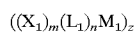     [1]

wherein $M_1$ represents a ruthenium atom or an osmium atom, $X_1$ independently represents an optional anionic ligand, $L_1$ independently represents an optional neutral electron donor compound, and a plurality of $X_1$ and $L_1$ may bond together to form a multidentate ligand; and m is an integer of 0 to 4, and n and z are integers of 1 to 4.

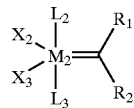

wherein $M_2$ represents a ruthenium atom or an osmium atom, $R_1$ and $R_2$ independently represents a hydrogen atom, a halogen atom, or a hydrocarbon group having 1 to 20 carbon atoms which may contain at least one atom selected from halogen, oxygen, nitrogen, sulfur, phosphorus and silicon atoms, $X_2$ and $X_3$ independently represents an optional anionic ligand, $L_2$ and $L_3$ independently represents an optional neutral electron donor compound, and a plurality of $R_1$, $R_2$, $X_2$, $X_3$, $L_2$ and $L_3$ may bond together to form a multidentate ligand.

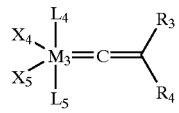

wherein $M_3$ represents a ruthenium atom or an osmium atom, $R_3$ and $R_4$ independently represents a hydrogen atom, a halogen atom, or a hydrocarbon group having 1 to 20 carbon atoms and having at least one atom selected from halogen, oxygen, nitrogen, sulfur, phosphorus and silicon atoms, $X_4$ and $X_5$ independently represents an optional anionic ligand, $L_4$ and $L_5$ independently represents an optional neutral electron donor compound, and a plurality of $R_3$, $R_4$, $X_4$, $X_5$, $L_4$ and $L_5$ may bond together to form a multidentate ligand.

The anionic ligand is not particularly limited provided that it is a ligand having a negative charge when it is kept apart from the central metal. The neutral electron donor compound is not particularly limited provided that it is a ligand having a neutral charge when it is kept apart from the central metal, i.e., a Lewis base.

As specific examples of the anionic ligands $X_1$, $X_2$, $X_3$, $X_4$ and $X_5$ in formulae [1], [2] and [3], there can be mentioned halogen atoms such as F, Br, Cl and I; a hydrogen atom, and acetylacetonate, diketonate, cyclopentadienyl, allyl, alkenyl, alkyl, aryl, alkoxy, aryloxy, alkoxycarbonyl, arylcarboxyl, carboxyl, alkyl- or aryl-sulfonate, alkylthio, alkenylthio, arylthio, alkylsulfonyl and alkylsulfinyl groups. Of these, a halogen atom, a cyclopentadienyl group, an allyl group, an alkyl group and an aryl group are preferable in view of the high activity for polymerization.

As specific examples of the neutral electron donor compound $L_1$, $L_2$, $L_3$, $L_4$ and $L_5$ in formulae [1], [2] and [3], there can be mentioned oxygen, water, carbonyls, amines, pyridines, ethers, nitriles, esters, phosphines, phosphinites, phosphites, stibines, sulfoxides, thioethers, amides, aromatics, cyclic diolefins, olefins, isocyanides, thiocyanates and heteroatom-containing carbene compounds. Of these, pyridines, phosphines, aromatics, cyclic diolefins and heteroatom-containing carbene compounds are preferable in view of the high activity for polymerization.

A polymerization catalyst having a heteroatom-containing carbene compound as at least part of the neutral electron donor compound in formulae [1], [2] and [3], especially a polymerization catalyst wherein at least ½ of the neutral electron donor compound is a heteroatom-containing carbene compound, more specifically, a polymerization catalyst wherein at least ½ of the mole number of $L_1$ in formula [1]

is a heteroatom-containing carbene compound, a polymerization catalyst wherein at least one of $L_2$ and $L_3$ in formula [2] is a heteroatom-containing carbene compound, and a polymerization catalyst wherein at least one of $L_4$ and $L_5$ in formula [3] is a heteroatom-containing carbene compound, are preferable in view of the high activity for polymerization.

The term "carbene compound" as used herein is a generic name meaning compounds having a methylene compound, that is, compounds having a divalent carbon atom with no electrical charge such as that expressed by ">C:". A carbene compound is generally present as an unstable intermediate produced during a reaction. However, when a carbene compound has a heteroatom, the carbene compound can be isolated as a relatively stable carbene compound. By the "heteroatom" as used herein is meant an atom selected from group 15 and group 16 of the periodic table. As specific examples of the heteroatom, there can be mentioned N, O, P, S, As and Se atoms. Of these, N, O, P and S are preferable for provision of stable carbene compounds. N and P are especially preferable.

The heteroatom-containing compound includes, for example, compounds represented by the following formulae [5] and [6].

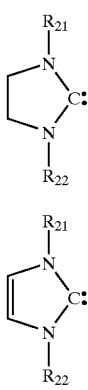

[5]

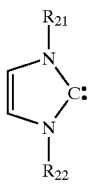

[6]

where in $R_{21}$ and $R_{22}$ each independently represents a hydrogen atom, or a hydrocarbon group having 1 to 20 carbon atoms which may contain at least one atom selected from halogen, oxygen, nitrogen, sulfur, phosphorus and silicon.

As specific examples of the heteroatom-containing carbene compound of formula [5], there can be mentioned 1,3-diisopropylimidazolidin-2-ylidene, 1,3-dicyclohexyl-imidazolidin-2-ylidene, 1,3-di(methylphenyl)imidazolidin-2-ylidene, 1,3-di(2,4,6-trimethyl)phenylimidazolidin-2-ylidene, 1,3-di(methylnaphthyl)imidazolidin-2-ylidene, 1,3-diadamantylimidazolidin-2-ylidene, 1,3-diphenylimidazolidin-2-ylidene and 1,3,4,5-tetramethylimidazolidin-2-ylidene.

As specific examples of the heteroatom-containing carbene compound of formula [6], there can be mentioned 1,3-diisopropyl-4-imidazolin-2-ylidene, 1,3-dicyclohexyl-4-imidazolin-2-ylidene, 1,3-di(methylphenyl)-4-imidazolin-2-ylidene, 1,3-di(2,4,6-trimethylphenyl)-4-imidazolin-2-ylidene, 1,3-di(methylnaphthyl)-4-imidazolin-2-ylidene, 1,3-diadamantyl-4-imidazolin-2-ylidene, 1,3-diphenyl-4-imidazolin-2-ylidene, 1,3,4,5-tetramethyl-4-imidazolin-2-ylidene and 1,3,4,5-tetraphenyl-4-imidazolin-2-ylidene.

The heteroatom-containing carbene compound further includes, in addition to those represented by formulae [5] and [6], 1,3,4-triphenyl-2,3,4,5-tetrahydro-1H-1,2,4-triazol-5-ylidene, 3-(2,6-diisopropylphenyl)-2,3,4,5-tetrahydrothiazol-2-ylidene, 1,3-dicyclohexylhexahydropirymidin-2-ylidene, N,N,N',N'-tetraisopropyl-formamidinylidene, 1,3,4-triphenyl-4,5-dihydro-1H-1,2,4-triazol-5-ylidene and 3-(2,6-diisopropylphenyl)-2,3-dihydrothiazol-2-ylidene.

Of the above-recited heteroatom-containing compounds, those in which an heteroatom adjacent to the carbene has a bulky substituent are especially preferable. Such preferable heteroatom-containing compounds include 1,3-diisopropylimidazolidin-2-ilidene, 1,3-dicyclohexylimidazolidin-2-ilidene, 1,3-di(methylphenyl) imidazolidin-2-ilidene, 1,3-di(2,4,6-trimethylphenyl) imidazolidin-2-ilidene, 1,3-di(methylnaphthyl) imidazolidin-2-ilidene, 1,3-diadamantylimidazolidin-2-ilidene, 1,3-diphenylimidazolidin-2-ilidene, 1,3,4,5-tetraphenylimidazolidin-2-ilidene, 1,3-diisopropyl-4-imidazolin-2-ilidene, 1,3-dicyclohexyl-4-imidazolin-2-ilidene, 1,3-di(methylphenyl)-4-imidazolin-2-ilidene, 1,3-di(2,4,6-trimethyl)-4-imidazolin-2-ilidene, 1,3,4-triphenyl-2,3,4,5-tetrahydro-1H-1,2,4-triazol-5-ilidene, 3-(2,6-diisopropylphenyl)-2,3,4,5-tetrahydrothiazol-2-ilidene and 1,3-dicyclohexylhexahydropirimidin-2-ilidene.

As specific examples of $R_1$, $R_2$, $R_3$ and $R_4$ in formulae [2] and [3], there can be mentioned a hydrogen atom, and alkenyl, alkynyl, alkyl, aryl, carboxyl, alkoxy, alkenyloxy, alkinyloxy, aryloxy, alkoxycarbonyl, alkylthio, alkenylthio, arylthio, alkylsulfonyl and alkylsulfinyl groups. Of these, alkyl, aryl, alkoxy, aryloxy, alkylthio and arylthio groups are preferable in view of the high activity.

As specific examples of the above-mentioned polymerization catalyst, there can be mentioned the following compounds.

Namely, polymerization catalysts of formula [1] include bis(cyclopentadienyl)ruthenium, chloro(cyclopentadienyl)bis(triphenylphosphine)ruthenium, dichloro(1,5-cyclooctadiene)ruthenium, dichlorotris(triphenylphosphine)ruthenium, cis-dichlorobis(2,2'-bipyridyl)ruthenium dihydrate, dichlorobis[(p-cymene)chlororuthenium)], dichloro(2,7-dimethylocta-2,6-diene-1,8-diyl)ruthenium, bis(cyclopentadienyl)osmium, dichloro(p-cymene)osmium, [1,3-diisopropylimidazolidin-2-ylidene](p-cymene)ruthenium dichloride, [1,3-diisopropylimidazolidin-2-ylidene]-(triphenylphosphine)ruthenium dichloride, [1,3-diisopropyl-4-imidazolin-2-ylidene](p-cymene)ruthenium dichloride and [1,3-diisopropyl-4-imidazolin-2-ylidene]-(triphenylphosphine)ruthenium dichloride.

Polymerization catalysts of formula [2] include ruthenium compounds having two heteroatom-containing carbene compounds coordinated thereto such as bis(tricyclohexylphosphine) benzylideneruthenium dichloride, bis(triphenylphosphine)-3,3-diphenylpropenylideneruthenium dichloride, bis(1,3-diisopropylimidazolidin-2-ylidene)benzylideneruthenium dichloride, bis(1,3-dicyclohexylimidazolidin-2-ylidene) benzylideneruthenium dichloride, bis(1,3-diisopropyl-4-imidazolin-2-ylidene)benzylideneruthenium dichloride and bis(1,3-dicyclohexyl-4-imidazolin-2-ylidene) benzylideneruthenium dichloride; and ruthenium compounds having a heteroatom-containing carbene compound and a neutral electron donor compound coordinated thereto such as (1,3-dicyclohexylimidazolidin-2-ylidene)(tricyclohexylphosphine)benzylideneruthenium dichloride, (1,3-dicyclohexyl-4-imidazolin-2-ylidene)(tricyclohexylphosphine)benzylideneruthenium dichloride. [1,3-bis(2,4,6-trimethylphenyl)imidazolidin-2-ylidene](tricyclohexylphosphine)benzylideneruthenium dichloride,

[1,3-bis(2,4,6-trimethylphenyl)imidazolidin-2-ylidene] (pentamethylcyclopentadienyl)benzylideneruthenium dichloride, [1,3bis(2,4,6-trimethylphenyl)-4-imidazolin-2-ylidene]-(tricyclohexylphosphine)benzylideneruthenium dichloride and [1,3-bis(2,4,6-trimethylphenyl)-4-imidazolin-2-ylidene](pentamethylcyclopentadienyl) benzylideneruthenium dichloride.

Polymerization catalysts of formula [3] include ruthenium compounds having two heteroatom-containing carbene compounds coordinated thereto such as bis(tricyclohexylphosphine) phenylvinylideneruthenium dichloride, bis(triphenylphosphine) t-butylvinylideneruthenium dichloride, bis(1,3-diisopropylimidazolidin-2-ylidene) phenylvinylideneruthenium dichloride, bis(1,3-dicyclohexylimidazolidin-2-ylidene)t-butylvinylideneruthenium dichloride, bis(1,3-diisopropyl-4-imidazolin-2-ylidene)phenylvinylideneruthenium dichloride and bis(1,3-dicyclohexyl-4-imidazolin-2-ylidene)t-butyl-vinylideneruthenium dichloride; and ruthenium compounds having a heteroatom-containing carbene compound and a neutral electron donor compound coordinated thereto such as (1,3-dicyclohexylimidazolidin-2-ylidene) (tricyclohexylphosphine)t-butylvinylideneruthenium dichloride, (1,3-dicyclohexyl-4-imidazolin-2-ylidene) (tricyclohexylphosphine) phenylvinylideneruthenium dichloride, [1,3-bis(2,4,6-trimethylphenyl)imidazolidin-2-ylidene] (tricyclohexylphosphine)t-butylvinylideneruthenium dichloride, [1,3-bis(2,4,6-trimethylphenyl)imidazolidin-2-ylidene](pentamethylcyclopentadienyl)phenylvinylidene ruthenium dichloride, [1,3-bis(2,4,6-trimethylphenyl)-4-imidazolin-2-ylidene](tricyclohexylphosphine) phenylvinylideneruthenium dichloride and [1,3-bis(2,4,6-trimethylphenyl)-4-imidazolin-2-ylidene] (pentamethylcyclopentadienyl)t-butylvinylideneruthenium dichloride.

The polymerization catalyst used in the present invention is usually prepared from a ruthenium-containing compound or an osmium-containing compound, or by mixing a ruthenium-containing compound or an osmium-containing compound with a heteroatom-containing compound and/or a neutral electron donor compound. Generally the respective compounds are dissolved in solvents and the solutions are mixed together in a predetermined ratio. The mixing is usually carried out in an inert gas at room temperature, but, it can be carried out at a higher temperature. When a heteroatom-containing carbene compound having a poor stability is used, it is possible that a precursor thereof is mixed with the other ingredient and the resulting mixture is heated to convert the precursor to the objective carbene compound.

It is considered that the entire amounts of the ruthenium-containing compound or the osmium-containing compound, the heteroatom-containing carbene compound and/or the neural electron donor compound are not involved in the reaction for production of the compounds of formulae [1], [2] and/or [3], but, the resulting reaction mixture can be used as it is as a polymerization catalyst in the present invention.

Alternatively, the ruthenium-containing compound or the osmium-containing compound, and the heteroatom-containing carbene compound and/or the neural electron donor compound can be separately introduced into a polymerization system to form a polymerization catalyst therein.

When a polymerization catalyst not containing the heteroatom-containing carbene compound is used, in order to enhance the polymerization activity, a diazo compound, an acetylene compound or a silyl compound can be added in an amount of 1 to 100 times by weight of the ruthenium or osmium metal.

The process of the present invention for producing a polymer through ring-opening polymerization of a cyclic olefin using a polymerization catalyst comprising an organoruthenium compound or an organoosmium compound, and a heteroatom-containing carbene compound is believed to be novel. This polymerization process can be effected with a very high polymerization activity. This beneficial process can be carried out the absence of a solvent, but is preferably carried out in the presence of a halogen-free solvent.

(Polymerization Process)

In the process for ring-opening polymerization of a cyclic olefin according to the present invention, the amount of a polymerization catalyst relative to the amount of the cyclic olefin, as expressed by the ratio of ruthenium metal or osmium metal in the polymerization catalyst/cyclic olefin by mol/mol, is usually in the range of 1/100 to 1/2,000,000 (mol/mol), preferably 1/500 to 1/1,000,000 (mol/mol) and more preferably 1/1,000 to 1/500,000 (mol/mol). If the amount of a polymerization catalyst is too large, the catalyst is difficult to remove. In contrast, if the amount of a polymerization catalyst is too small, the desired polymerization activity cannot be obtained.

When the polymerization is carried out in a solvent, the concentration of a cyclic olefin in its solution is preferably in the range of 1 to 50% by weight, more preferably 2 to 45% by weight and especially preferably 5 to 40% by weight. When the monomer concentration is smaller than 1% by weight, the productivity is poor. In contrast, when the monomer concentration is larger than 50%, the as-obtained polymer solution exhibits undesirably high viscosity and the succeeding hydrogenation becomes difficult.

The ring-opening polymerization can be carried out in the absence of a solvent. However, to carry out the hydrogenation reaction after completion of the polymerization, the polymerization is preferably carried out in a solvent, and especially preferably in a halogen-free solvent.

Halogen-containing solvents are not general-purpose and contaminate the environment, and thus, a halogen-free solvent is beneficial. The halogen-free solvent used is not particularly limited, provided that the polymer and the hydrogenated polymer are soluble therein under certain conditions and the solvent does not exert baneful influence on both of the polymerization and the hydrogenation. But, general-purpose solvents are preferable.

As specific examples of the halogen-free solvent, there can be mentioned aliphatic hydrocarbon solvents such as pentane, hexane and heptane; alicyclic hydrocarbon solvents such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane and cyclooctane; aromatic hydrocarbon solvents such as benzene, toluene and xylene; nitrogen-containing hydrocarbon solvents such as nitromethane, nitrobenzene and acetonitrile; and ether solvents such as diethyl ether and tetrahydrofuran. Of these, general-purpose aromatic hydrocarbon solvents, aliphatic hydrocarbon solvents and alicyclic hydrocarbon solvents are preferable. In view of inertness to polymerization and hydrogenation, and capability of dissolving a polymer therein, alicyclic hydrocarbon solvents such as cyclohexane are most preferable.

The polymerization reaction is initiated by mixing the above-mentioned monomer with the polymerization catalyst. The polymerization temperature is not particularly limited, but, is usually in the range of −30° C. to 200° C., preferably 0° C. to 180° C. The polymerization time is usually in the range of 1 minute to 100 hours.

To control the molecular weight of a cyclic olefin polymer, a molecular weight modifier can be used. As specific examples of the molecular weight modifier, there can be mentioned α-olefins such as 1-butene, 1-pentene, 1-hexene and 1-octene; styrene and its analogues such as vinyltoluene; ethers such as ethyl vinyl ether, isobutyl vinyl ether and allyl glycidyl ether; halogen-containing vinyl compounds such as allyl chloride; oxygen-containing vinyl compounds such as allyl acetate, allyl alcohol and glycidyl methacrylate; and nitrogen-containing vinyl compounds such as acrylamide. The amount of the molecular weight modifier can be appropriately chosen within the range of 0.1% to 10% by mole based on the cyclic olefin.

At the termination of polymerization, vinyl compounds such as those recited above as examples of a molecular weight modifier can be added to liberate a ruthenium compound or an osmium compound from a terminal of the polymer chain, thereby enhancing the activity for hydrogenation.

In consideration of the hydrogenation reaction, the resulting polymer has a number average molecular weight (Mn) of 1,000 to 500,000, more preferably 5,000 to 200,000, as measured by gel permeation chromatography and expressed in terms of that of polystyrene.

(Hydrogenation of Polymer)

In the present invention, after the ring-opening polymerization, a hydrogenation catalyst and hydrogen are added to a polymerization system resulting from the ring-opening polymerization step to hydrogenate the carbon-carbon double bonds in the polymer prepared through the ring-opening polymerization.

(Hydrogenation Catalyst)

The hydrogenation catalyst used is not particularly limited, provided that it is capable of being generally used for hydrogenation of olefins and aromatic compounds. As specific examples of the hydrogenation catalyst, there can be mentioned (1) a metal catalyst supported on a carrier, including those which comprise a transition metal such as palladium, platinum, nickel, rhodium or ruthenium supported on a carrier such as carbon, alumina, silica or diatomaceous earth, (2) a homogeneous catalyst comprising an organic transition metal compound such as those containing titanium, cobalt or nickel as the transition metal, and an organometallic compound such as those containing lithium, magnesium, aluminum or tin, and (3) a metal complex catalyst such as those containing rhodium or ruthenium.

As specific examples of the metal catalyst supported on a carrier (1), there can be mentioned metal/carrier combinations such as nickel/silica, nickel/diatomaceous earth, nickel/alumina, palladium/carbon, palladium/silica, palladium/diatomaceous earth, palladium/alumina, platinum/silica, platinum/alumina, rhodium/silica, rhodium/alumina, ruthenium/silica and ruthenium/alumina.

As specific examples of the homogeneous catalyst (2), there can be mentioned organic transition metal compound/organometallic compound combinations such as cobalt acetate/triethylaluminum, nickel acetylacetonate/triisobutylaluminum, titanocene dichloride/n-butyllithium, zirconocene dichloride/sec.-butyllithium and tetrabutoxy titanate/dimethylmagnesium.

As specific examples of the metal complex catalyst (3), there can be mentioned dihydridotetra(triphenylphosphine) ruthenium, dihydrido(acetonitrile)tris(triphenylphosphine) ruthenium and dihydrido(tetrahydrofuran)tris (triphenylphosphine)ruthenium.

Of the above-recited catalysts, the metal catalyst supported on a carrier (1) is beneficial in that it is capable of adsorbing an organoruthenium compound or an organoosmium compound, used as a polymerization catalyst, and therefore, when the hydrogenation catalyst is separated and recovered by filtration after completion of hydrogenation, the polymerization catalyst can be recovered together with the hydrogenation catalyst.

The time at which the hydrogenation catalyst is added to a polymerization system is not particularly limited provided that the catalyst is added after the ring-opening polymerization. The catalyst can be added at any time of before, at the same time or after the commencement of hydrogen addition. Even when the hydrogenation catalyst is added after the commencement of hydrogen addition, it is possible that the hydrogenation proceeds to a slight extent due to the polymerization catalyst before the addition of the hydrogenation catalyst.

(Hydrogenation Reaction)

Adequate conditions employed for hydrogenation varies depending upon the particular hydrogenation catalyst. Hydrogenation temperature is usually in the range of −20° C. to 250° C., preferably −10° C. to 220° C. and more preferably 0° C. to 200° C. Hydrogen pressure is usually in the range of 0.1 to 100 kg/cm$^2$, preferably 0.5 to 70 kg/cm$^2$ and more preferably 1 to 50 kg/cm$^2$. At a too low hydrogenation temperature, the rate of hydrogenation reaction is low. In contrast, at a too high hydrogenation temperature, side reactions occur. At a too low hydrogen pressure, the rate of hydrogenation reaction is low. In contrast, at a too high hydrogen pressure, a high pressure reactor must be used.

Usually the hydrogenation is carried out in an inert organic solvent. The organic solvent can be appropriately chosen depending upon solubility of the hydrogenation product. As specific examples of the organic solvent, there can be mentioned aromatic hydrocarbons such as benzene and toluene; aliphatic hydrocarbons such as n-pentane and n-hexane; alicyclic hydrocarbons such as cyclohexane and decalin; and ethers such as tetrahydrofuran and ethylene glycol dimethyl ether. Of these, hydrocarbons and ethers are preferable in view of high capability of dissolving the hydrogenation product therein. Among the hydrocarbon solvents, alicyclic hydrocarbon solvents are especially preferable.

The organic solvent may be the same as that used for polymerization. That is, the hydrogenation can be carried out by adding a hydrogenation catalyst to the as-produced organic solvent-containing polymerization system.

Hydrogenation time is usually in the range of 0.1 to 10 hours, during which at least 70%, preferably at least 90% and more preferably at least 95% of the carbon-carbon double bonds in the backbone chain of polymer can be hydrogenated.

(Removal of Catalyst)

After completion of the hydrogenation reaction, the polymerization catalyst and the hydrogenation catalyst are removed from the hydrogenation reaction solution by the following process. The metal catalyst supported on a carrier (1) can be removed by filtration. The polymerization catalyst and the homogeneous catalyst (2) and the metal complex catalyst (3) such as those containing rhodium or ruthenium can be removed by a known process including a process using an adsorbent for adsorptive removal, and a process f or washing with water or a lower alcohol in the presence of an organic acid and/or inorganic acid. Of these, the process using an adsorbent for adsorptive removal employed when the hydrogenation is conducted by using the catalyst (2) or (3) has a problem such that a large amount of an adsorbent is usually necessary, and the process for washing has a problem such that the washing must be repeated several times. In contrast, the process using the metal catalyst supported on a carrier (1) is especially beneficial in that, as a polymerization catalyst is adsorbed by a small amount of a hydrogenation catalyst, the polymerization catalyst and the hydrogenation catalyst can be removed at the same time merely by filtration.

(Hydrogenated Polymer Product)

The hydrogenated polymer product has a number average molecular weight such that the lower limit is preferably 5,000, more preferably 7,000 and especially preferably 10,000 and the upper limit is preferably 1,000,000, more preferably 500,000 and especially preferably 200,000. If the number average molecular weight is too small, the mechanical properties are poor. In contrast, If the number average molecular weight is too large, it becomes difficult to produce.

The invention will now be specifically described by the following examples and comparative examples.

(1) Molecular weight of a polymer prepared through ring-opening polymerization was measured by gal permeation chromatography (GPC) using tetrahydrofuran (THF) as a solvent and expressed in terms of that of polystyrene. Molecular weight of a hydrogenated product of a polymer prepared through ring-opening polymerization was measured by gel permeation chromatography (GPC) using cyclohexane as a solvent and expressed in terms of that of polyisoprene.

(2) Hydrogenation percentage was measured by $^1$H-NMR.

(3) The amounts of a polymerization catalyst residue and a hydrogenation catalyst residue were determined by wet ashing a hydrogenated product of polymer, and conducting the measurement on the ashed product by inductively coupled plasma emission spectrometry.

In the examples and comparative examples, parts are by weight unless otherwise specified.

EXAMPLE 1

Ring-opening Polymerization and Hydrogenation

An autoclave equipped with a stirrer was charged with 110 parts of cyclohexane as a solvent, 21.0 parts of dicyclopentadiene and 9.0 parts of 8-ethyltetracyclododecene, and 0.17 part of 1-hexene as a molecular weight modifier. Then, 0.099 part of dichlorotris(triphenylphosphine) ruthenium, 0.029 part of tricyclohexylphosphine and 0.124 part of trimethylsilyldiazomethane were incorporated in 10 ml of toluene whereby they are allowed to react with each other to give a catalyst solution. The catalyst solution was added into the above-mentioned autoclave and polymerization was carried out at 60° C. for 1 hour. Then, 2.76 parts of ethyl vinyl ether was added to terminate the polymerization. The molecular weight of the obtained polymer was measured by GPC. The polymer had a number average molecular weight (Mn) of 12,500 and a weight average molecular weight (Mw) of 29,500, as expressed in terms of that of polystyrene.

Thereafter, added into the autoclave a hydrogenation catalyst solution prepared by dissolving 0.14 part of nickel (II) acetylacetonate and 0.42 part of isobutylaluminum in 10 parts of cyclohexane. Hydrogenation reaction was carried out at a hydrogen pressure of 10 kg/cm$^2$ and a temperature of 120° C. for 5 hours. After the completion of reaction, the reaction liquid was cooled and 150 parts of cyclohexane was added for dilution. Then, the reaction liquid was washed with a diluted hydrochloric acid three times and then with water three times, anhydrous magnesium sulfate was added and then the reaction liquid was left to stand one day. Then the reaction liquid wad filtered by a filter to remove anhydrous magnesium sulfate to obtain a colorless transparent polymer solution. Analysis of the polymer solution for determining the content of metal elements derived from the polymerization catalyst and the hydrogenation catalyst revealed that the contents of Ru and Ni in the polymer solution were 2 ppm and 5 ppm, respectively.

The polymer solution was poured in a large amount of isopropanol to precipitate a polymer. The polymer was collected by filtration, washed, and dried under reduced pressure at 80° C. for 40 hours. Thus, a hydrogenation product of polymer prepared through ring-opening polymerization was obtained in a yield of 29.0 parts. The product had a number average molecular weight (Mn) of 14,300 and a weight average molecular weight (Mw) of 32,200, as expressed in terms of that of polyisoprene. The hydrogenation percentage was 90%.

EXAMPLE 2

Ring-opening Polymerization and Hydrogenation

The polymerization procedures as described in Example 1 were repeated wherein 15.0 parts of tetracyclododecene and 15.0 parts of norbornene were used as cyclic olefins, 0.17 part of 1-hexene was used as a molecular weight modifier, and a solution prepared by dissolving 0.059 part of bis(1, 3-diisopropylimidazol-2-ylidene)benzylideneruthenium dichloride in 10 ml of toluene was used as a polymerization catalyst. All other conditions remained the same as in Example 1.

The resultant polymer had a number average molecular weight (Mn) of 14,100 and a weight average molecular weight (Mw) of 32,200, as expressed in terms of that of polystyrene.

Thereafter, 3.0 parts of 5% Pd/alumina catalyst was added as a hydrogenation catalyst, and hydrogenation reaction was carried out at a hydrogen pressure of 10 kg/cm$^2$ and a temperature of 150° C. for 5 hours. After the completion of reaction, the reaction liquid was cooled and filtered by a filter to remove the hydrogenation catalyst, thereby giving a colorless transparent polymer solution. Analysis of the polymer solution for determining the content of metal elements derived from the polymerization catalyst and the hydrogenation catalyst revealed that the contents of Ru and Pd in the polymer solution were below limit of detection, i.e., below 1 ppm.

By the same procedures as described in Example 1, a hydrogenation product of polymer was obtained. The yield was 29.0 parts. The product had a number average molecular weight (Mn) of 24,100 and a weight average molecular weight (Mw) of 48,100, as expressed in terms of that of polyisoprene. The hydrogenation percentage was 96%.

EXAMPLE 3

Ring-opening Polymerization and Hydrogenation

The polymerization procedures as described in Example 1 were repeated wherein 15.0 parts of dicyclopentadiene and 15.0 parts of norbornene were used as cyclic olefins, 0.26 part of 1-hexene was used as a molecular weight modifier, and a catalyst solution prepared by dissolving 0.017 part of bis(tricyclohexylphosphine)benzylideneruthenium dichloride in 10 ml of cyclohexane was used as a polymerization catalyst. All other conditions remained the same as in Example 1.

The resultant polymer had a number average molecular weight (Mn) of 8,400 and a weight average molecular weight (Mw) of 18,200, as expressed in terms of that of polystyrene.

Thereafter, 0.3 part of 40% Ni/diatomaceous earth catalyst was added as a hydrogenation catalyst, and hydrogenation reaction was carried out at a hydrogen pressure of 10 kg/cm$^2$ and a temperature of 150° C. for 5 hours. After the completion of reaction, the reaction liquid was cooled and filtered by a filter to remove the hydrogenation catalyst, thereby giving a colorless transparent polymer solution. Analysis of the polymer solution for determining the content of metal elements derived from the polymerization catalyst and the hydrogenation catalyst revealed that the contents of Ru and Ni in the polymer solution were below limit of detection. i.e., below 1 ppm.

By the same procedures as described in Example 1, a hydrogenation product of polymer was obtained. The yield was 29.0 parts. The product had a number average molecular weight (Mn) of 9,300 and a weight average molecular weight (Mw) of 19,300, as expressed in terms of that of polyisoprene. The hydrogenation percentage was larger than 99%.

COMPARATIVE EXAMPLE 1

Ring-opening Polymerization and Hydrogenation

The procedures for polymerization and hydrogenation as described in Example 3 were repeated wherein, after the addition of ethyl vinyl ether, hydrogen was blown into the polymerization liquid but a hydrogenation catalyst was not newly added, and the hydrogenation reaction was carried out at a hydrogen pressure of 10 kg/cm$^2$ and a temperature of 150° C. for 5 hours.

The polymerization was carried out at a high temperature, i.e., 60° C., to enhance the polymerization activity, and therefore, the catalyst was deactivated and the hydrogenation percentage was 18%.

COMPARATIVE EXAMPLE 2

Ring-opening Polymerization and Hydrogenation

The polymerization procedures as described in Example 3 were repeated wherein a catalyst solution was prepared from 0.053 part of tungsten hexachloride, 0.13 part of tetrabutyltin and 0.048 part of dibutyl ether, instead of bis (tricyclohexylphosphine)benzylideneruthenium dichloride with all other conditions remaining the same. The resultant polymer had a number average molecular weight (Mn) of 7,300 and a weight average molecular weight (Mw) of 18,200, as expressed in terms of that of polystyrene.

Thereafter, hydrogenation was carried by the same procedures as described in Example 3. The yield of a hydrogenation product of polymer was 29.0 parts. The product had a number average molecular weight (Mn) of 7,700 and a weight average molecular weight (Mw) of 18,300, as expressed in terms of that of polyisoprene.

The amount of a hydrogenation catalyst added was small and therefore the hydrogenation percentage was 10%.

EXAMPLE 4

Ring-opening Polymerization and Hydrogenation

The polymerization procedures as described in Example 1 were repeated wherein the amount of cyclohexane was changed to 90 parts, 21.0 parts of dicyclopentadiene and 9.0 parts of 8-ethyltetracyclododecene was used as cyclic olefins, 0.17 part of 1-hexene was used as a molecular weight modifier, and a solution prepared by dissolving 0.085 part of bis(tricyclophosphine)benzylideneruthenium dichloride in 10 parts of cyclohexane was used as a polymerization catalyst. All other conditions remained the same as in Example 1.

The resultant polymer had a number average molecular weight (Mn) of 13,600 and a weight average molecular weight (Mw) of 31,100, as expressed in terms of that of polystyrene.

Thereafter, hydrogenation reaction was carried out at a hydrogen pressure of 10 kg/cm$^2$ and a temperature of 150° C. for 2 hours. At this time, the hydrogenation percentage was 65%. Then, 0.6 part of 5% Pd/alumina catalyst was added as a hydrogenation catalyst, and hydrogenation reaction was further carried out at a hydrogen pressure of 10 kg/cm$^2$ and a temperature of 150° C. for 5 hours. After the completion of reaction, the reaction liquid was cooled and filtered by a filter to remove the hydrogenation catalyst, thereby giving a colorless transparent polymer solution. Analysis of the polymer solution for determining the content of metal elements derived from the polymerization catalyst And the hydrogenation catalyst revealed that the contents of Ru and Pd in the polymer solution were below limit of detection, i.e., below 1 ppm.

By the same procedures as described in Example 1, a hydrogenation product of polymer was obtained. The yield was 29.0 parts. The product had a number average molecular weight (Mn) of 14,300 and a weight average molecular weight (Mw) of 33,300, as expressed in terms of that of polyisoprene. The hydrogenation percentage was larger than 99%.

EXAMPLE 5

Ring-opening Polymerization

A 100 ml glass reactor equipped with a stirrer was charged with 30 ml of cyclohexane, 3.97 g (30 milli-mol) of dicyclopentadiene and 0.10 milli-mol of 1-hexene as a molecular weight modifier. A catalyst solution prepared by dissolving 0.010 milli-mol of bis(1,3-diiospropyl-4-imidazolin-2-ylidene)benzylideneruthenium dichloride in 5 ml of toluene was added and polymerization was carried out at 60° C. After addition of the catalyst, the viscosity of the polymerization liquid gradually increased, but the polymerization liquid was a transparent solution and a polymer was not precipitated. One hour later, the polymerization liquid was poured into a large amount of isopropanol to precipitate a polymer. The polymer was collected by filtration, washed, and dried under reduced pressure at 40° C. for 40 hours. Thus, a polymer prepared through ring-opening polymerization was obtained in a yield of 3.6 g. The polymer had a number average molecular weight (Mn) of 55,500 and a weight average molecular weight (Mw) of 129,500, as expressed in terms of that of polystyrene. The polymer was soluble in toluene and THF at room temperature.

EXAMPLE 6

Ring-opening Polymerization

A 200 ml autoclave equipped with a stirrer was charged with 60 ml of cyclohexane, 7.94 g (60 milli-mol) of dicyclopentadiene and 0.90 milli-mol of 1-hexene as a molecular weight modifier. A catalyst solution prepared by dissolving 0.010 milli-mol of [1,3-bis(2,4,6-trimethylphenyl)-4-imidazolin-2-ylidene](tricyclohexylphosphine) benzylideneruthenium dichloride in 10 ml of toluene was added and polymerization was carried out at 60° C. The thus-obtained polymer had a number average molecular weight (Mn) of 10.500 and a weight average molecular weight (MW) of 24,500, as expressed in terms of that of polystyrene.

EXAMPLE 7

Ring-opening Polymerization and Hydrogenation

A 200 ml autoclave equipped with a stirrer was charged with 20 ml of cyclohexane, 7.94 g (60 milli-mol) of dicyclopentadiene and 0.90 milli-mol of 1-hexene as a molecular weight modifier. A catalyst solution prepared by dissolving 0.010 milli-mol of bis(1,3-dicyclohexyl-4-imidazolin-2-ylidene)benzylideneruthenium dichloride in 10 ml of toluene was added and polymerization was carried out at 60° C. for 1 hour. The thus-obtained polymer had a number average molecular weight (Mn) of 10,700 and a weight average molecular weight (Mw) of 23,900, as expressed in terms of that of polystyrene.

Thereafter, 0.8 g of 5% Ni/diatomaceous earth catalyst was added, and hydrogenation reaction was carried out at a hydrogen pressure of 20 kg/cm$^2$ and a temperature of 160° C. for 6 hours. The hydrogenation percentage was 99.9%. The hydrogenation product of polymer had a number average molecular weight (Mn) of 14,600 and a weight average molecular weight (Mw) of 32,100, as expressed in terms of that of polyisoprene.

EXAMPLE 8

Ring-opening Polymerization

The procedures described in Example 5 were repeated wherein tetracyclododecene was used instead of dicyclopentadiene with all other conditions remaining the same. After the addition of a catalyst, the viscosity of the polymerization liquid gradually increased, but the polymerization liquid was a transparent solution and a polymer was not precipitated. One hour later, the polymerization liquid was poured into a large amount of isopropanol to precipitate a polymer. The polymer was collected by filtration, washed, and dried under reduced pressure at 40° C. for 40 hours. Thus, a polymer prepared through ring-opening polymerization was obtained in a yield of 3.4 g. The polymer had a number average molecular weight (Mn) of 68,100 and a weight average molecular weight (Mw) of 154,200, as expressed in terms of that of polystyrene. The polymer was soluble in toluene, THP and chloroform at room temperature.

EXAMPLE 9

Ring-opening Polymerization and Hydrogenation

The procedures for ring-opening polymerization and hydrogenation, described in Example 7 were repeated wherein tetracyclododecene was used instead of dicyclopentadiene and palladium/carbon catalyst was used instead of nickel/diatomaceous earth catalyst with all other conditions remaining the same. The thus-obtained polymer had a number average molecular weight (Mn) of 8,400 and a weight average molecular weight (Mw) of 20,100, as expressed in terms of that of polystyrene. The hydrogenation percentage was 96%. The hydrogenation product of polymer had a number average molecular weight (Mn) of 12,600 and a weight average molecular weight (Mw) of 29,500, as expressed in terms of that of polyisoprene.

EXAMPLE 10

Ring-opening Polymerization

The procedures described in Example 5 were repeated wherein 0.00030 milli-mol of [1,3-bis(2,4,6-trimethylphenyl)imidazolidin-2-ylidene](tricyclohexylphosphine)benzylideneruthenium dichloride was used instead of 0.010 milli-mol of bis(1,3-diiospropyl-4-imidazolin-2-ylidene)benzylideneruthenium dichloride with all other conditions remaining the same. After the addition of a catalyst, the viscosity of the polymerization liquid gradually increased, but the polymerization liquid was a transparent solution and a polymer was not precipitated. One hour later, the polymerization liquid was poured into a large amount of isopropanol to precipitate a polymer. The polymer was collected by filtration, washed, and dried under reduced pressure at 40° C. for 40 hours. Thus, a polymer prepared through ring-opening polymerization was obtained in a yield of 3.8 g. The polymer had a number average molecular weight (Mn) of 46,200 and a weight average molecular weight (Mw) of 123,200, as expressed in terms of that of polystyrene. The polymer was soluble in toluene and THF at room temperature.

EXAMPLE 11

Ring-opening Polymerization

The procedures described in Example 5 were repeated wherein [1,3-bis(1-phenylethyl)imidazolidin-2-ylidene](tricyclohexylphosphine)benzylideneruthenium dichloride was used instead of bis(1,3-diiospropyl-4-imidazolin-2-ylidene)benzylideneruthenium dichloride and the amount of 1-hexene was changed to 0.30 milli-mol with all other conditions remaining the same. After the addition of a catalyst, the viscosity of the polymerization liquid gradually increased, but the polymerization liquid was a transparent solution and a polymer was not precipitated, One hour later, the polymerization liquid was poured into a large amount of isopropanol to precipitate a polymer. The polymer was collected by filtration, washed, and dried under reduced pressure at 40° C. for 40 hours. Thus, a polymer prepared through ring-opening polymerization was obtained in a yield of 3.9 g. The polymer had a number average molecular weight (Mn) of 25,100 and a weight average molecular weight (Mw) of 60,200, as expressed in terms of that of polystyrene. The polymer was soluble in toluene and THF at room temperature.

EXAMPLE 12

Ring-opening polymerization

The procedures described in Example 5 were repeated wherein 0.00030 milli-mol of [1,3-bis(2,6-diethylphenyl)imidazolidin-2-ylidene](tricyclohexylphosphine) benzylideneruthenium dichloride was used instead of 0.010 milli-mol of bis(1,3-diiospropyl-4-imidazolin-2-ylidene) benzylideneruthenium dichloride and the amount of 1-hexene was changed to 0.30 milli-mol with all other conditions remaining the same. After the addition of a catalyst, the viscosity of the polymerization liquid gradually increased, but the polymerization liquid was a transparent solution and a polymer was not precipitated. One hour later, the polymerization liquid was poured into a large amount of isopropanol to precipitate a polymer. The polymer was collected by filtration, washed, and dried under reduced pressure at 40° C. for 40 hours. Thus, a polymer prepared through ring-opening polymerization was obtained in a yield of 3.7 g. The polymer had a number average molecular weight (Mn) of 21,200 and a weight average molecular weight (Mw) of 44,800, as expressed in terms of that of polystyrene. The polymer was soluble in toluene and THF at room temperature.

Industrial Applicability

According to the present invention wherein where a cyclic olefin is polymerized through ring-opening polymerization using a polymerization catalyst comprising an organoruthenium compound or an organoosmium compound, and then a hydrogenation catalyst and hydrogen are added in the as-obtained polymerization system, even though the polymerization catalyst is not removed from the as-obtained polymerization system, a hydrogenation product of polymer prepared through ring-opening polymerization can be efficiently and industrially stably produced with the use of a small amount of the hydrogenation catalyst. Further, the polymerization catalyst and the hydrogenation catalyst can be efficiently removed after the hydrogenation reaction. Especially when a heterogeneous catalyst supported on a carrier is used as the hydrogenation catalyst added after polymerization, the polymerization catalyst and the hydrogenation catalyst can be more easily removed.

When a polymerization catalyst comprising an organoruthenium compound or an organoosmium compound and further a heteroatom-containing carbene compound, is used, a cyclic olefin can be polymerized with a higher activity, and the resulting polymer is not precipitated even in a general-purpose solvent such as cyclohexane.

What is claimed is:

1. A process for producing a hydrogenated product of a polymer prepared through ring-opening polymerization, which comprises:

a polymerization step of polymerizing a cyclic olefin through ring-opening polymerization in the presence of a polymerization catalyst comprising an organoruthenium compound or an organoosmium compound to prepare a polymer, and a hydrogenation step of adding a hydrogenation catalyst and hydrogen into a polymerization system resulting from the polymerization step to hydrogenate the carbon-carbon double bonds in the polymer prepared through the ring-opening polymerization.

2. The process for producing a hydrogenated product of a polymer prepared through ring-opening polymerization according to claim 1, wherein the polymerization catalyst further comprises a heteroatom-containing carbene compound.

3. The process for producing a hydrogenated product of a polymer prepared through ring-opening polymerization according to claim 1, wherein the cyclic olefin contains at least 1% by weight, based on the total weight thereof, of at least one kind of compound selected from dicylopentadienes and tertracyclodoecenes.

4. The process for producing a hydrogenated product of a polymer prepared through ring-opening polymerization according to claim 1, wherein the hydrogenation catalyst is a catalyst supported on a carrier.

5. The process for producing a hydrogenated product of a polymer prepared through ring-opening polymerization according to claim 1, which further comprises, subsequent to the hydrogenation step, a catalyst-removing step of separating and removing the polymerization catalyst and the hydrogenation catalyst by filtration from the hydrogenation reaction product mixture.

6. A process for producing a polymer through ring-opening polymerization, characterized in that a cyclic olefin is polymerized through ring-opening polymerization using a polymerization catalyst comprising an organoruthenium compound or an organoosmium compound, and a heteroatom-containing carbene compound in the absence of a solvent or in the presence of a halogen-free solvent.

7. The process for producing a polymer prepared through ring-opening polymerization according to claim 6, wherein the cyclic olefin contains at least 1% by weight, based on the total weight thereof, of at least one kind of compound selected from dicyclopentadienes and tetracyclododecenes.

8. A process for producing a hydrogenated product of a polymer prepared through ring-opening polymerization, characterized in that a hydrogenation catalyst and hydrogen are added into a polymerization system resulting from the ring-opening polymerization process as claimed in claim 6 or 7 to hydrogenate at least a part of the carbon-carbon double bonds of the polymer produced through ring-opening polymerization.

9. The process for producing a hydrogenated product of a polymer prepared through ring-opening polymerization according to claim 8, wherein the hydrogenation catalyst is a catalyst supported on a carrier.

\* \* \* \* \*